United States Patent
Rice et al.

[11] Patent Number: 6,132,804
[45] Date of Patent: Oct. 17, 2000

[54] HIGH PERFORMANCE COMPOSITE MEMBRANE

[75] Inventors: William C. Rice, Medway; John P. Puglia, Townsend, both of Mass.

[73] Assignee: Koch Membrane Systems, Inc., Wilmington, Mass.

[21] Appl. No.: 09/092,398

[22] Filed: Jun. 5, 1998

Related U.S. Application Data

[60] Provisional application No. 60/048,954, Jun. 6, 1997.

[51] Int. Cl.[7] .................. B05D 1/36; B05D 1/40
[52] U.S. Cl. .............. 427/245; 427/244; 427/333; 427/412.2; 118/217; 118/255
[58] Field of Search .................. 427/333, 244, 427/245, 412.2; 118/217, 255

[56] References Cited

U.S. PATENT DOCUMENTS

| | | | |
|---|---|---|---|
| 3,260,691 | 7/1966 | Lavin et al. | 260/30.2 |
| 3,480,588 | 11/1969 | Lavin et al. | 260/47 |
| 4,277,344 | 7/1981 | Cadotte | 210/654 |
| 4,416,214 | 11/1983 | Tanaka et al. | 118/410 |
| 4,659,474 | 4/1987 | Perry et al. | 210/638 |
| 4,767,645 | 8/1988 | Linder et al. | 427/386 |
| 4,889,636 | 12/1989 | Perry et al. | 210/651 |
| 4,938,994 | 7/1990 | Choinski | 427/96 |
| 5,069,945 | 12/1991 | Wrasidlo | 427/245 |
| 5,143,758 | 9/1992 | Devine | 427/420 |
| 5,254,261 | 10/1993 | Tomaschke et al. | 210/654 |
| 5,268,204 | 12/1993 | Hill et al. | 427/393 |
| 5,474,802 | 12/1995 | Shimoda et al. | 427/163.1 |
| 5,516,545 | 5/1996 | Sandock | 427/76 |
| 5,522,991 | 6/1996 | Tuccelli et al. | 210/490 |
| 5,658,460 | 8/1997 | Cadotte et al. | 210/500.38 |
| 5,693,227 | 12/1997 | Costa | 210/650 |

OTHER PUBLICATIONS

Modern Coating and Drying Technology, by Edward D. Cohen and Edgar B. Gutoff (No date).

*Primary Examiner*—Shrive Beck
*Assistant Examiner*—Kirsten A. Crockford
*Attorney, Agent, or Firm*—Shook, Hardy & Bacon L.L.P.

[57] ABSTRACT

A process for producing high quality reverse osmosis, nanofiltration, and ultrafiltration membranes in a high speed process provides membranes which have excellent rejection characteristics coupled with high flux capabilities. The process employs tandem coating techniques to coat a microporous substrate with a thin membrane on the order of 25 Å to 1.0 microns. The tandem coating process comprises tandem offset gravure and subsequent slot die coating applicators, or alternatively comprises tandem slot die coating applicators. For reverse osmosis and nanfiltration membranes, a wet-on-wet coating process is used to coat a porous substrate first with an aqueous solution, and then with an organic solution to produce a cross-linked, interfacially polymerized composite membrane. Single slot coating applicators are utilized to produce ultrafiltration membranes.

25 Claims, 2 Drawing Sheets

HIGH PERFORMANCE COMPOSITE MEMBRANE

CROSS-REFERENCE TO RELATED APPLICATION

This application is entitled to priority pursuant to provisional application Ser. No. 60/048,954, filed Jun. 6, 1997, entitled Filtration Membrane.

STATEMENT REGARDING FEDERALLY SPONSORED RESEARCH OR DEVELOPMENT

Not applicable.

BACKGROUND OF THE INVENTION

This invention relates to permselective barriers in the form of thin membranes useful for the selective separation of mixtures of fluids, fluids and particulates, and solutions. More particularly, this invention relates to a method for fabrication of a permselective membrane suitable for reverse osmosis, nanofiltration, ultrafiltration and the like.

It is well known that dissolved substances, such as salts, minerals, and the like, can be separated from their solvents, such as water, by a technique known as reverse osmosis. For example, the mineral and salt content of seawater can be reduced substantially by utilizing reverse osmosis membranes to produce potable and/or commercially usable low salt water. Similarly, softened water for household or industrial use may be obtained from relatively hard water with high total dissolved solids content. Softened water is important for prolonging the life of various kinds of delicate machinery and for producing water which is usable in a variety of commercial and domestic applications. Perhaps the greatest impact of filtration technology to the increasingly industrialized world is the desalinization of brackish water or seawater to provide large quantities of relatively salt-free water for industrial, agricultural, or residential use. As the world continues to industrialize and population continues to increase at a rapid rate, increasing demands will be made on supplies of fresh water so that availability of efficient and effective mechanisms to convert brackish water and saltwater to productive uses will be increasingly important.

Of importance similar to reverse osmosis membranes are nanofiltration and ultrafiltration membranes, which are used to filter molecules and particulates from solutions and mixtures. For explanation purposes, the discussion below focuses upon reverse osmosis membranes, although one skilled in the art would realize that similar considerations apply to nanofiltration and ultrafiltration membranes. Reference herein to filtration membranes thus includes reverse osmosis, nanofiltration, and ultrafiltration membranes.

Reverse osmosis basically is a filtering out of dissolved ions or molecules by applying a hydraulic pressure to the water to be filtered to force it through a reverse osmosis membrane. Such membranes are selectively permeable for the water, but reject passage of unwanted constituents, typically salts and various dissolved minerals. Osmotic pressure, the tendency of solute components to spread evenly to both sides of a membrane, works against the reverse osmosis process. The more the feed water is concentrated with unwanted components, the greater is the osmotic pressure which must be overcome. Thus, to be practical, a reverse osmosis membrane must strongly reject passage of the unwanted components, commonly referred to in the art as having high rejection characteristics.

In osmosis, the application of pressure to a saline solution that causes movement of water through a solid or liquid barrier while preventing the phases from remixing rapidly requires a theoretical osmotic pressure of 115 psi to desalt a 1% NaCl solution at 25° C. Therefore, the more restrictive the solid or liquid barrier is to solution flow, the higher the pressure required to drive the desalting process. The term associated with restrictive flow is pressure drop. It is intuitive that the thicker the barrier layer existing between the salt and desalted solutions, the higher the pressure required to desalt the solution.

In many instances, reverse osmosis membranes currently are fabricated utilizing a porous substrate upon which is coated a monomer or polymer which is subsequently cross-linked, such as is disclosed in U.S. Pat. No. 4,277,344, issued to Cadotte, which is hereby incorporated by reference. The Cadotte patent reveals that good salt rejection and flow characteristics can be obtained with a reverse osmosis membrane made from cross-linked, interfacially polymerized aromatic polyamides. The membranes created with the Cadotte process represent a n important advancement over prior art membranes due to significant improvements in the ion rejection characteristics, flow characteristics, and resistance to oxidative attack.

The process for making reverse osmosis membranes utilizing Cadotte technology is to coat a porous support layer with a polyamine component. The porous support layer with the polyamine coating is contacted with polyacyl halide, initiating an interfacial polymerization in situ on the support. The resulting product is dried to provide a composite membrane comprising the polyamide laminated to the porous support. The in situ cross-linking provides a mechanical adhesion of the resulting cross-linked reverse osmosis membrane to the support substrate.

Existing methods for performing a coating process like the Cadotte process utilize dip coating technology. In dip coating, the desired substrate is run on a continuous basis and is conveyed through a first liquid bath, coating both sides of the substrate with a first component, e.g., polyamine, and next is conveyed through a second liquid bath containing the second component, e.g., polyacyl halide, after which the membrane is conveyed through any desired rinsing processes, and then through a drying oven. The membrane layers thus formed are typically on the order of from about 0.5 microns to about 1.0 microns.

A primary drawback to the dip coating approach is that the results of the substrate coating process are dependent upon many hard to regulate factors, including the viscosity, cohesion, and adhesion properties of the coatings in the tanks, which properties vary with temperature, solution makeup, and other similar factors. For example, dip tanks depend upon gravity, whereby excess coating is allowed to run off from the substrate. Thus, due to the various factors affecting viscosity, adhesion, and cohesion of the coating, the thickness of the coating is difficult to control. The variations in thickness of the coating applied to the substrate can cause breaks or voids in the membrane coating, resulting in substantially reduced membrane effectiveness or failure of the product involved. It is common in the industry that up to twenty percent of the dip-coated substrate becomes scrap material due to such deficiencies in the resultant coated membrane products.

Further, a dip coating process may result in cross-contamination between the tanks as the substrate is passed from one tank to the next. A certain excess amount of the first constituent which does not sufficiently run off of the substrate is carried into the second tank, causing buildup of the constituents from the first dip tank in the second dip tank. This results in variations in the concentration and make-up of the constituents in the second tank, which variation progressively changes as the process continues, ultimately leading to variations in the effectiveness of the cross-linking occurring between the two coated layers, with corresponding variations in the final membrane. Often, these excess constituents remaining on the substrate must be extracted in subsequent baths of citric acid, bleach, and the like.

Further, the second dip tank is typically sized to be large enough so that an entire batch of membranes (e.g. an eight hour run of material) may be run before the constituent in the second tank becomes so contaminated that it must be discarded. As a result, large amounts of waste dip coating chemicals typically are created in the dip coating process.

In addition, the constituents tend to permeate the porous substrate during the dip coating process, creating several potential problems. First, the thickness of the filter layer of the filtration membrane inversely impacts the capacity of the membrane, whereby the thicker that the filter layer is, the lower is the membrane capacity. Because dip coating constituents tend to permeate the substrate, the resulting filter layer effectively extends into the substrate. In contrast, an ideal filter membrane would have only a thin filter layer formed upon the surface of the substrate. Second, because the dip coating components permeate the substrate, excess components tend to be left in the substrate after the final dip coating operation. These excess components must be cleaned from the membrane by rinsing the coated substrate in a strong solvent such as citric acid. Such rinsing adds to the cost and environmental impact of such processes. Also, due to the process whereby the substrate is dipped into a tank, both sides of the substrate necessarily become coated with the constituents. This resultant back side "quasi membrane" acts to further thicken the membrane, with the associated adverse effects discussed above, and in addition interferes with adhesion requirements for leaf formation when used for the spiral winding process in spiral wound filtration elements.

Due to the variations in thickness inherent in dip coating technology, a relatively thick coating must be applied in order to minimize the number of voids and breakthroughs in the membrane, and is typically on the order of from about 0.5 microns to about 1.0 microns. This thicker coating effectively limits the throughput of the membrane by producing a more substantial barrier to propagation of the water through the membrane, thus reducing the overall functional usefulness of the membrane thus produced. For example, reverse osmosis membranes produced utilizing conventional dip coating techniques typically have a coating which is about 0.5 microns thick or greater, resulting in a nominal 24 gallons per square foot per day (gfd) (40.8 liters per square meter per hour (lmh)) throughput of common seawater with a 98.5% rejection factor.

In order to control some of the problems inherent in dip tank coating of membranes, the substrate is conveyed through the dip tanks at a relatively slow rate, typically about 3 meters (10 feet) per minute. This slow production rate reduces, but does not eliminate, the carryover, thickness variation, and similar problems inherent in dip coating. However, the slow production rate significantly increases the capital cost of the equipment required for a given production rate.

Another limitation of dip tank technology is that significant environmental problems are presented. The chemicals utilized in the tanks typically are quite volatile and potentially harmful to the environment and personnel working in the area. As dip tanks are open to the environment to the extent necessary to allow the film membrane to pass in and out of the liquid interface, they inherently have large surfaces which are required to be sealed from the environment. Therefore, significant environmental limitations on dip coating technology reduce the efficient production of high quality reverse osmosis membranes. Also, allowing some chemical constituents to be relatively open to the environment poses problems in situations in which the constituents are unstable and tend to oxidize or otherwise react due to such exposure to light and air.

Conventional filtration membranes also have been produced by other than dip coating techniques. Ultrafiltration membranes have been produced utilizing coating methods generally referred to as "extrusion" or "knife-over-roll" processes such as are disclosed in U.S. Pat. No. 5,522,991, issued to Tuccelli et al. Coatings utilizing knife-over-roll or extrusion-type processes utilize relatively high viscosity coating fluids and typically have a substantially thicker ultimate coating than is desired for reverse osmosis membranes. For example, in the Tuccelli patent, a coating solution of 8% to 25% solvated N-methyl pyrrolidone (NMP) or dimethyl acetamide (DMAC) is used, which has a viscosity of between about 10,000 centipoise (cps) and about 60,000 cps. In the knife-over-roll or extrusion processes, because of the use of relatively high viscosity fluid, the movement of the membrane past the roller knife or extruder nozzle pulls a portion of the fluid out of the extruder or under the knife. Such a process is not suitable for use on filtration membranes formed utilizing chemistries similar to Cadotte, because such chemistries require a "wet-on-wet" process in which a second wet layer is applied while the previously applied first layer is still wet. Application of a second layer by an extruder or knife-over-roll process would have a tendency to disrupt the uniformity of the previously coated wet layer because of the tension applied to it by the high viscosity of the second fluid being pulled onto the substrate as it passes by the second extruder nozzle or over the knife roller. Thus, the pulling action effectively prevents use of knife-over-roller or extrusion processes for wet-on-wet applications. Further, the film thickness achievable by knife-over-roller and extrusion processes similar to those disclosed in the Tuccelli patent are typically from 5 to 15 microns, with an accuracy of plus or minus approximately 10% of the desired thickness. That film thickness is greater than desired for a reverse osmosis membrane. Thus, it is apparent that neither an extrusion nor a knife-over-roller process is applicable to the production of reverse osmosis membranes utilizing the chemistries described herein.

Slot coating is an established technology which originated in the photographic industry as a high quality process by which multiple micron-thick layers can reliably be coated at relatively high speeds, such as is disclosed in U.S. Pat. No. 5,143,758 issued to Devine. A type of slot coating is also used in coating substrates in the electronics industry such as is disclosed in U.S. Pat. No. 5,516,545 issued to Sandock. Slot coating is a continuous coating technique which delivers quantitatively precise amounts of material, typically of low solids and viscosity characteristics, to an applicator which then deposits quantitatively precise amounts of the material on to a traveling web or other substrate through a slot in the applicator from which the fluid exits. Slot coating technology typically allows web speed s in excess of 100 ft/min (30 meters/min ). As a point of comparison, the dip coating technology utilized in current reverse osmosis membrane coating techniques allows a speed of substrate movement through the tanks on the order of approximately 10 ft/min (3 meters/min).

Conventional usages of slot coating technologies have generally been limited to smooth nonporous surfaces, such as photographic films and papers and circuit boards, and have further been limited to non-interactive chemistries. For example, in the electronics industry, slot coating typically has been used to apply photoresist and similar single-layer coatings to nonporous substrates, such as individual circuit boards. Typical slot coating of photographic films involves application of multiple layers of liquids which are not interactive with each other or with the substrate. Indeed, typical photographic applications which are slot coated and require multiple wet-on-wet layers use a "cascade" or "slide" coater which applies multiple but often different liquid layers simultaneously from a single coating head having multiple slots, such as is shown in the Devine patent. For each slot in a cascade coater there is a corresponding channel which feeds the desired fluid to the slot orifice. As the fluid flows out of the many slots, the bottom fluid comes out of the die and onto the substrate with the other layers on top of it. There is no intermixing, reaction, or interaction which occurs, as the coating uniformity is carefully controlled via appropriate viscosities and pH levels. Thus, when coating with layers of solutions which are highly reactive in nature, the use of cascade slot coating would not be operative, as the instantaneous formation of polymer would result in coating defects which ultimately translate into poor product performance. In contrast, as described above, creation of filtration membranes typically involves application of interactive low viscosity chemical layers to porous substrates. Application of such multiple layers of interactive chemicals is generally not feasible in a cascade coater, because of cross-contamination of the chemicals and buildup of cross-reacted chemicals on the slot coaters. In addition, the liquid constituents deposited by a cascade coater must not only be n on-reactive, but also must have relatively high viscosity, along the order of 400 cps. Further, slot coating multiple layers using a conventional cascade coater requires that the fluids be aqueous, as solvent systems can not be used with such a system.

An other technology which has found utilization in the printing industry is gravure coating. Gravure coating is a process by which a thin liquid film is quantitatively deposited onto a substrate by means of a rotating roll. The surface of the gravure roll possesses an engraved pattern of cells, the dimensions of which can be carefully controlled by acid etching or electromechanical techniques. The wet coating thickness is then determined by the cell volume and uniformity. One of the drawbacks to gravure coating is that moderate changes in coating thickness typically require that the gravure roll cell characteristics, i.e., cell depth, pitch, cell wall dimensions, need to be redesigned and subsequently etched in. This is a timely and costly process.

SUMMARY OF THE INVENTION

It is therefore an object of the present invention to provide an enhanced filtration membrane product ion process which reduces variation in the thickness of resulting membrane coatings, and, thus, enhances the effectiveness and utility of the membranes produced.

It is a primary object of this invention to provide an enhanced filtration membrane production process in which the speed of production is substantially increased over existing processes.

It is an additional object of the present invention to provide an enhanced filtration membrane in which the relative throughput of processed liquid is substantially higher than is available in current filtration membranes.

It is an additional object of this invention to produce a high quality production system which minimizes breakthrough and voids in the membranes produced and, thus, minimizes the cost of producing filtration membranes.

It is a further object of the present invention to create a filtration membrane in a manner which minimizes the safety, health and environmental risks inherent in such production processes.

It is yet another object of the present invention to provide a molecularly thick membrane thinner than previously possible, so that flux and efficiency, or rejection, can be increased in a controlled manner.

It is a still further object of the present invention to eliminate the possibility of cross contaminating the individual membrane coating constituents, so that higher quality membranes can be formed while reducing associated production costs.

It is an additional object of the present invention to provide a process whereby the stoichiometry of the reaction can be controlled by deposit ing exact amounts of the individual membrane constituents onto a substrate so as to eliminate the need for and use of excess constituents, decrease production costs, and control resultant flux and rejection characteristics.

It is still another object of the present invention to provide a process whereby each coating constituent is deposited onto a substrate only where desired, so that the effectiveness of the resultant membrane is enhanced.

Other and further objects and aim s of this invention will be obvious from the attached specification and claims.

The present invention is a unique process for continuously coating a porous substrate to form a composite filtration membrane comprising the steps of providing a first liquid component; providing a first applicator means for applying the first liquid component onto the substrate; applying the first component onto the substrate to coat the substrate and form a liquid layer by relatively moving the substrate and the first applicator with respect to each other; providing a second liquid component; providing a second applicator means in tandem with the first applicator means for applying the second liquid component; applying the second liquid component onto the liquid layer to contact the second liquid component with the liquid layer by relatively moving the substrate coated with the liquid layer and the second applicator with respect to each other; allowing the first and second liquid components to interfacially polymerize to form a composite layer; and drying the composite layer to form a composite membrane.

In one aspect, the present invention provides a process for continuously coating a porous substrate to prepare a composite reverse osmosis membrane comprising the steps of slot coating or offset gravure coating the porous substrate with an essentially monomeric, aromatic polyamine reactant to form a first layer, slot coating onto the wet first layer an essentially monomeric, aromatic multifunctional acid chloride capable of reacting with the first layer to interfacially polymerize and present a composite layer. Finally, the layers are dried to form a reverse osmosis membrane. This process produces a membrane with flux capabilities on the order of 40 to 50 gfd (66.7 to 83.3 lmh), with high salt rejection characteristics on the order of 98.5% or greater.

In another aspect, the present invention provides a process for continuously coating a porous substrate to prepare a composite nanofiltration membrane comprising the steps of providing a first liquid component comprising an aqueous solution of a first reactant in water; providing a first applicator means for applying the first liquid component onto the substrate, wherein the applicator means comprises either an offset gravure applicator or a slot die applicator; applying the first component onto the substrate to coat the substrate and form a liquid layer by relatively moving the substrate and the first applicator with respect to each other; providing a second liquid component is an organic solution comprising a second reactant and a solvent; providing a second applicator means in tandem with the first applicator means for applying the second liquid component, wherein the second applicator means comprises a slot die applicator; applying the second liquid component onto the liquid layer to contact the second liquid component with the liquid layer by relatively moving the substrate coated with the liquid layer and the second applicator with respect to each other; allowing the first and second liquid components to interfacially polymerize to form a composite layer; and drying the composite layer to form a composite nanofiltration membrane.

In another aspect of the present invention, a process is provided for continuously coating a porous substrate to prepare a composite filtration membrane, the process comprising providing a liquid component which is a solution comprising a polymer selected from the group consisting of polyethersulfone and polysulfone, a solvent for the polymer, and a nonsolvent for the polymer; providing an applicator means for apply ing the liquid component onto the substrate, wherein the applicator means comprises a slot die applicator; applying the component onto the substrate to coat the substrate and form a liquid layer by relatively moving the substrate and the first applicator with respect to each other; and drying the layer to form an ultrafiltration membrane.

DETAILED DESCRIPTION OF THE INVENTION

Figure 1:
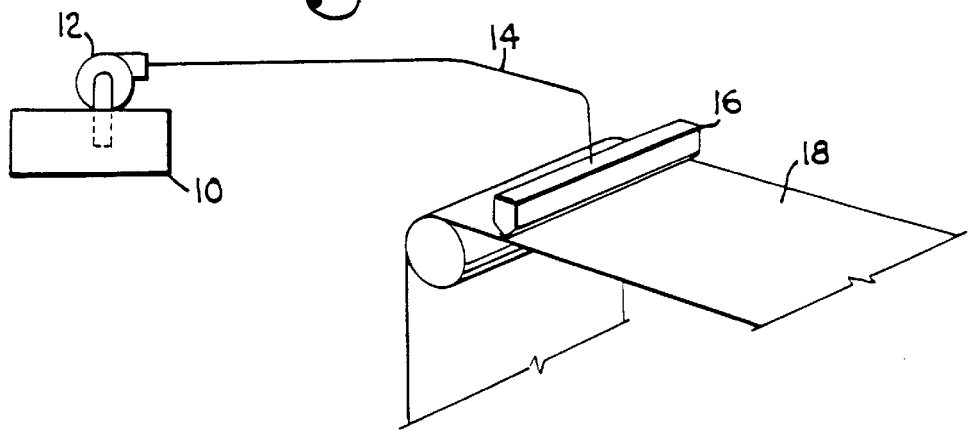
FIG. 1 is a diagrammatic representation of a single slot die coating apparatus.

The basic tandem slot die coating process involved in the present invention is explained in part by reference to the figures attached to this application. FIG. 1 is a diagrammatic representation showing a typical single layer slot die coating apparatus. In a slot coating system, a reservoir 10 contains a chemical constituent desired to be applied, which is metered by a volumetric pump 12 through a feed tube 14 to a slot die applicator 16 and onto a substrate 18. The speed of the substrate 18 and chemical feed parameters are closely monitored and controlled by use of standard computer control techniques. The slot die applicator 16 applies the metered portion of fluid evenly onto the substrate 18.

Figure 2:
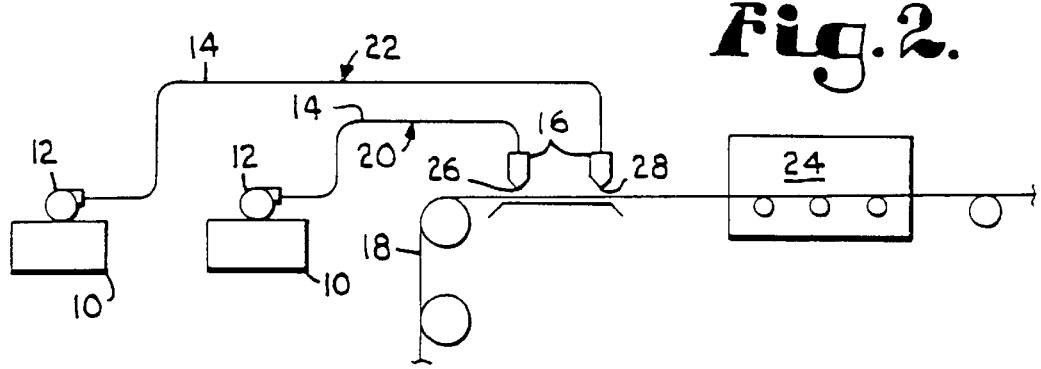
FIG. 2 is a diagrammatic representation of a dual or tandem slot die coating process of the present invention.
Figure 3:
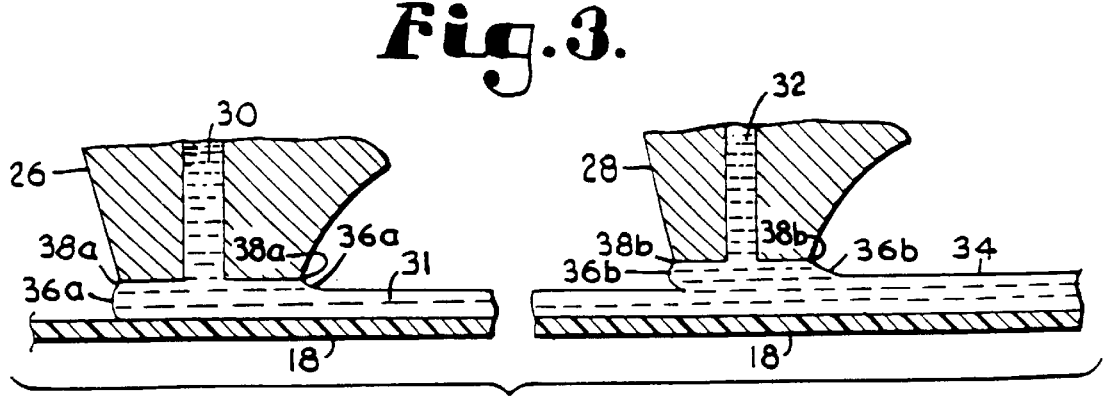
FIG. 3 is an enlarged, fragmentary cross-sectional view of the tandem slot die coating tips of the present invention.

FIG. 2 is a diagrammatic representation depicting a dual or tandem slot die coater of the present invention. Tandem slot die coating refers to wet-on-wet application of two or more fluid coating layers. By definition, such a process does not provide for drying of a previously applied layer prior to application of subsequent layers. It will be understood by one skilled in the art that additional slot dies can be utilized to form additional layers or, conversely, a single slot die may be used. Essentially, a first slot die assembly 20 and a second slot die assembly 22 deliver the requisite coating materials to the substrate 18. Each assembly operates in a manner similar to the single assembly shown in FIG. 1. For ease of comparison, corresponding elements in FIGS. 1, 2 and 3 are identified by corresponding numerals. Thus, in FIG. 2, reservoirs are indicated by reference numerals 10a and 10b, each desired coating fluid is metered through pumps 12a and 12b, through feed tubes 14a and 14b, to slot die applicators 16a and 16b.

In FIG. 2, the substrate 18 is fed over a series of rollers 19 past the slot die applicators 16a and 16b, in sequence, passing the coating tip 26 of the first slot die assembly 20 and then, typically while the first coating remains wet, passing a second slot die tip 28 of the second slot die assembly 22. Because slot coating utilizes relatively low viscosity fluid, the second coating may be applied without drying of the first coating. Indeed, in order to achieve the desired in situ crosslinking of the layers, it is not desirable to allow drying of any layer prior to application of the subsequent layer. The substrate thus coated with both fluids is subsequently fed through an oven 24 to dry the composite product.

FIG. 3 depicts the two slot die tips 26, 28 arranged for the wet-on-wet slot die coating process of the present invention in greater detail. In FIG. 3, the substrate 18 is shown passing under the first slot die tip 26 and then under the second slot die tip 28. As the membrane passes the first slot die tip 26, the first coating fluid 30 is placed upon the substrate. As shown in FIG. 3, in slot coating, the shape of the tip 26 allows the coating fluid 30 to form two fluid fronts 36a at the tip which forms a uniform bead across the substrate. The fronts 36 thus formed a repinned by the cohesive forces of the coating fluid to the sharp lips 38a of the tip 26, thus controlling the dynamics of the coating application. While still wet, the first coating layer 31 passes under the second slot die tip 28 where the second coating fluid 32 is applied. Similar to the first coating, the second coating fluid 32 forms front 36b at lips 38b of the tip 28, and the composite coating layer or barrier layer 34 exits the pair of slot coating die tips.

Preferably, the volumetric pumps 12, 12a and 12b are high-precision metering pumps, capable of moving precise volumes of solution to within 0.1% of a target flow rate. When combined with the dynamics of the slot die tips, coating thickness can be controlled to within 1% of the target coverage. As described herein, the coating solutions utilized in the present invention are dilute solutions with low viscosity characteristics. Thus, the coating fluid 32 being applied through tip 28 of the second slot die assembly 22 can be applied without disturbing the wet coating layer 31 previously applied by the first slot die assembly 20. Moreover, the low viscosity and low surface tension of the coating fluids 30, 32 enhance seven spreading of the fluids on the substrate 18 after application. It is the combination of all of these factors which provides an extremely accurate and reliable coating process.

The coating fluids 30, 32 thus applied crosslink interfacially on the substrate 18 to form a permselective barrier layer 34, and also crosslink with the substrate 18 after passage from the slot die tips, 26 and 28. With respect to chemistries similar to those utilized in the Cadotte process, the placement of the tips 26 and 28 and oven 24 must be such that sufficient time is allowed for the second coating fluid 32 to react with the first coating fluid 30 prior to full drying of the membrane, in order to allow effective crosslinking or membrane formation to occur. As this reaction typically occurs within milliseconds due to the relatively thin layer of materials applied, relatively little distance is needed between the tips 26 and 28, and between the second tip 28 and the oven 24. Typical wet layer thicknesses produced in accordance with the present invention are on the order of 6.5 microns (650 mg/ft$^2$ or 6500 mg/meter$^2$ coverage) for a typical aqueous solution for the first layer 30, and on the order of 13 microns (1300 mg/ft$^2$ or 13,000 mg/meter$^2$ coverage) for a typical solvent solution for the second layer 32.

This ability to provide these relatively thin layers using the tandem slot die coating process of the present invention allows the resultant composite layer or barrier layer to be molecularly thick, along the order of 25 Å to 1.0 microns. The manufacture of such a molecularly thick membrane has heretofore not been possible using conventional membrane manufacturing processes.

As one skilled in the art of slot coatings will appreciate, pumping rates are derived from web speed, width, and desired coverage. Further, preferred coverages, substrate, web speed, and the like generally dictate coating tip configuration. Accordingly, it will be understood by one skilled in the art that the precise tip configuration shown in FIG. 3 is diagrammatic in nature, and can be suitably varied as is necessary for a particular application. In particular, various angles of the slot die relative to the substrate may be used on the tip to enhance spreading characteristics, depending upon the precise properties of the substrate and fluids involved. Moreover, the tips preferably are configured so that the angle of the tip with respect to the substrate may be varied so as to minimize bubbling, air entrainment and voids in the fluid applied, depending upon the circumstance of the particular process application. The preferred range of the angle of the tip with respect to the substrate is from about 15% to about 45°.

Figure 4:
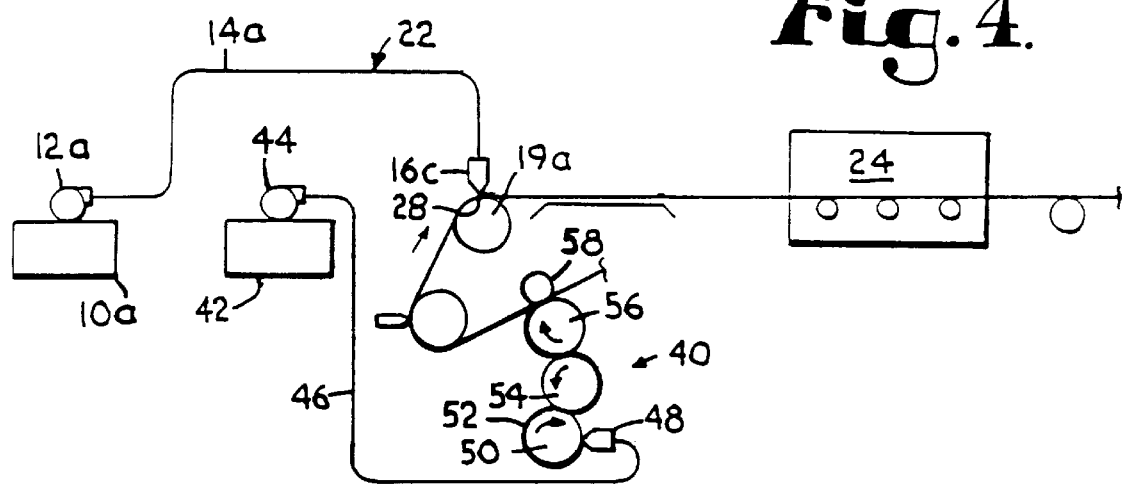
FIG. 4 is a diagrammatic representation of a tandem offset gravure/slot die coating process of the present invention.

An alternative embodiment is depicted in FIG. 4, whereby the process is essentially the same as that depicted and described with respect to FIG. 2, with the first slot die applicator 26 depicted therein being substituted in the tandem coating process of the present invention with a reverse roll offset gravure applicator, generally referred to by the numeral 40. Again, for ease of comparison, corresponding elements in the figures are identified by corresponding numerals where possible. The offset gravure applicator 40 has a fluid reservoir 42 which contains a chemical constituent desired to be applied, which is metered by volumetric pump 44 through a feed tube 46 to an offset gravure applicator tip 48, which then delivers a quantitatively precise amount of fluid to a first reverse gravure roller 50. The fluid 52 forms a thin coating on the first reverse gravure roller 50, which is then transferred to a blanket roller 54, whereby it is then transferred to a second reverse gravure roller 56. The fluid 52 on the second reverse gravure roller 56 then contacts the traveling substrate 18, whereby the fluid coating 52 transfers from the second reverse gravure roller 56 to the substrate 18. The top roller 58 is a backing roll which functions to move the substrate 18 in the direction indicated. After being coated with the first fluid 52, the coated substrate 18 travels toward the slot die roller 19c, whereby the second fluid is applied by slot die applicator 16c as described above. As in the previously described embodiments, the composite membrane thus coated onto the substrate 18 travels next to the oven 24c for drying.

The preferred substrate utilized in the present invention is an a symmetrical, microporous polymer which has ultrafiltration properties, and which is supported by a carrier web comprising a nonwoven synthetic material to facilitate facile flux of the permeate. Preferred pore size of the substrate ranges from about 0.01 to about 0.02 microns, and the membrane preferably is about 2 to 5 mils (0.0001 to 0.0013 meters) thick. Typical polymeric coating substrates which may effectively be utilized in this process are polysulfone, polyethersulfone, polyacrylonitrile, polyaramid, polyolefins, or cellulosic. Various coating substrates may require a preservation step prior to the slot coating to assure maintenance of asymmetric pore structure during the drying of the applied coatings.

With respect to reverse osmosis membranes formed in accordance with the present invention, superior results have been obtained using a first coating fluid 30 which comprises an aqueous solution containing from about 1% to 3% by weight 1,3-phenylenediamine (metaphenylenediamine, MPD), with the balance deionized water. More preferably, a solution of MPD in water is utilized. In a preferred embodiment, the quantity of MPD ranges from about 1% to 5% in water, with the more preferred range being about 2% to 4%. Depending on the specific applications for which the membranes are ultimately to be utilized, various other water soluble polyamine species are suitable, both polymeric and low molecular weight materials, such as poly (ethyleneimine), poly(vinylpyridine), and triethylenetetramine. Viscosity for the first coating fluid 30 preferably is from about 1 cps to about 100 cps, depending upon the nature of the solute, and more preferably between about 1 and 20 cps.

In one embodiment, a surfactant is added to the solution in order to improve the wettability of the first coating fluid 30 to the substrate. Suitable surfactants include fluorinated or aliphatic-type materials in which the hydrophilic portion of the surfactant molecule may be nonionic, anionic, or cationic. The critical concentration of the surfactant is specific to the soluble species molecule utilized, but a generally suitable concentration, based upon the weight of the surfactant relative to the weight of the coating solution, is from about 0.05% to about 0.25%. Typically, concentrations of about 0.15% by weight are preferred. When selecting a surfactant, it should be noted that the surfactant utilized in this process may have an interaction with the solutions involved beyond simply providing wettability, and therefore can have a significant impact on the ultimate membrane properties, which impact may be undesirable.

Regarding the second coating fluid 32, good results have been obtained using an organic solution of about 1% by weight of trimesyol chloride (TMC) combined with a co-solvent. However, other organic moieties will also produce acceptable results, and can include cyanuric chloride or bischloromethylpyridine. The viscosity of organic solutions used as the second coating fluid 32 preferably range from about 0.6 cps to 100 cps . The more preferred range for the second coating layer 32 is between 0.8 and 20 cps. The co-solvent composition comprises a hydrocarbon solvent and a high boiling point solvent. The purpose of the high boiling point solvent is to control the rate of evaporation of the solvent, and to thereby impart a certain reaction time which is required for proper membrane formation. One may effectively use a hydrocarbon solvent, such as hexane, as the primary constituent of this co-solvent blend. The high boiling solvent should be present in concentrations ranging from about 1% to about 99% by weight, but usually a 15% concentration is preferred. Several high boiling solvents have work ed effectively, such as isoalkanes and naphtha-type compositions. For example, VM&P Naphtha HT or EC as manufactured by Shell Petroleum of Houston, Tex. provides good results.

Preferable coating coverages will vary depending upon the intended use of the membrane, as well as specific solutions utilized to create the membranes. A calculation of the preferred coverages is generally derived from theoretical stoichiometry of the reaction, in conjunction with surface area considerations. For example, when TMC is interfacially condensed with MPD, the preferred wet coating coverage for a 1% by weight solution of TMC is from about 1000 to about 1500 mg/ft$^2$ (11,000 to 16,000 mg/meter$^2$), with about 1300 mg/ft$^2$ (14,000 mg/meter$^2$) most preferred. For MPD, effective wet coating coverages of a 2% by weight solution are found in the range of 350 mg/ft$^2$ to 900 mg/ft$^2$ (3,800 to 9,700 mg/meter$^2$), but 650 mg/ft$^2$ (7000 mg/meter$^2$) is preferred. The resulting dry film is molecularly thick, whereby the thickness of the barrier layer or composite layer is on the order of one micron or less, with a variation of ±1% of the targeted coverage. The preferred thickness is about 25 Å to about 0.2 microns.

It is of note that the Cadotte patent teaches that the molar ratios of the reactants are not critical because the reaction of the components occurs substantially only at the interface of the materials. However, surprisingly different results have unexpectedly been demonstrated by the present invention process. Marked improvement in flux characteristics of the resultant membrane are demonstrated when near-stoichiometric amounts of MPD and TMC are utilized with the ratio of MPD to TMC being 3:2. In particular, it appears that if in excess of up to 50% of the stoichiometric a mount of MPD or TMC is utilized, the flux capabilities of the resultant membrane will be maximized without an increased rejection capacity. More particularly, about 20 to 30% excess MPD or TMC appears to maximize the flux capacity of the resulting membrane.

The preferred dry coverage of the MPD ranges from about 10 mg/ft$^2$ to 20 mg/ft$^2$ (100 to 200 mg/meter$^2$), with the most preferred dry coverage being about 12 mg/ft$^2$ to 14 mg/ft$^2$ (120 to 140 mg/meter$^2$). Dry coverage of the TMC preferably ranges from about 8 mg/ft$^2$ to 14 mg/ft$^2$ (80 to 100 to 140 mg/meter$^2$), with the most preferred dry coverage being about 8 mg/ft$^2$ to 10 mg/ft$^2$ (80 to 100 mg/meter$^2$). Of course, the precise dry coverage of the MPD and the TMC solutions will be selected based on the above-noted stoichiometry of the reaction.

The co-solvent composition of the organic solution is important, as this composition controls the rate of drying of the organic layer, together with the dry bulb temperature and air impingement in the oven. This drying of the organic layer occurs simultaneously with the back side evaporation of water from the aqueous layer, and preferably is balanced with it in order to optimize formation and performance of the final membrane.

The rate at which a material is dried in the oven 24 and the corresponding wet load of the compositions both have a large effect on the ultimate performance of the membrane produced. For example, drying conditions of the thin film composite, which has desirable reverse osmosis capabilities, include a dry bulb temperature in the oven of from about 50° C. to about 90° C., but 65° C. is preferred. Similarly, the residence time for the thin film composite in the oven may vary from about 18 to about 60 seconds, with about 27 seconds being found to be optimum. The static pressure of the heated air impinging on the web is kept to a minimum to maintain the uniformity of the wet coating as it dries, and typically is in the range of 0.05 inches of water. Web speeds from about 20 linear ft/min to about 200 linear ft/min (6 to 60 linear meters/min) have been demonstrated to produce acceptable membranes. The preferred web speeds range from about 60 to about 100 linear feet/min.

Similar to the reverse osmosis membranes discussed above, according to one embodiment of the present invention, nanofiltration membranes are obtained by consecutively slot coating two immiscible fluids upon a microporous substrate. The reaction kinetics of the coating are such that the reaction may happen spontaneously, or the curing of reactants may take several days in order to form a semipermeable barrier layer. Such reactions are described in U.S. Pat. Nos. 4,659,474, 4,767,645, and 4,889,636, which are incorporated herein by reference.

A preferred approach for producing nanofiltration membranes includes utilizing an aqueous solution comprised of about 2% by weight of poly(ethyleneimine) (PEI) with a 60,000 weight average molecular weight, such as Lupasol P™ which is available from BASF Company of Rensselaer, N.Y., coated onto a microporous substrate. Such coating fluid preferably contains a small amount of surfactant, typically about 0.08% by weight, to aid in the wettability of the coating fluid. The preferred microporous substrate can comprise polyethersulfone, polysulfone, poly(acrylonitrile), poly(imides), poly(etherimides), and copolymers and blends of these materials. The dry coverage of the PEI ranges from about 10 mg/ft$^2$ to 200 mg/ft$^2$ (100 to 2000 mg/meter$^2$), but typically about 20 mg/ft$^2$ (200 mg/meter$^2$) is preferred. The second layer of coating fluid slot coated onto the PEI coating layer is preferably an organic solution which contains cyanuric chloride, chlorinated pyridines, chlorinated pyrimidines, modified trianzyl moieties, or other nitrogen reactive molecules. The organic solvent utilized in the solution is such that it is not miscible with the first coating layer and is preferably hexane, although other nonpolar organic solvents may be used. Dry coverage of the nitrogen reactive species, for example, may range from about 1 mg/ft$^2$ to about 20 mg/ft$^2$ (10 to 200 mg/meter$^2$), but about 10 mg/ft$^2$ (100 mg/meter$^2$) is preferred.

It is generally known that the reactivity of cyanuric chloride and nitrogen atoms with PEI is relatively slow. To enhance their reactivity during the slot coating process, high temperature ovens preferably are used to accelerate the reaction time. In addition, to maintain the porosity of the microporous substrate, a preservative step known to those skilled in the art is preferred.

Ultrafiltration membranes are typically asymmetrical with an active layer which is a thin, dense permselective skin having pores for the size exclusion separation phenomenon of ultrafiltration. Ultrafiltration membranes can be made utilizing several chemistries known in the art and, in the present invention, preferably are made using a single slot coater. In utilizing slot coating technology, asymmetrical membranes are preferably made of polyethersulfone or polysulfone by combining a nonsolvent and a good solvent along with the polymer in solution. Those solvents defined as good solvents are generally described in *Principles of Polymer Chemistry*, P. J. Flory (Cornell, 1953), which is incorporated herein by reference. The nonsolvent employed functions as the pore former in this case. The solvent is preferably volatile, and typically has a boiling point about 40° C. lower than the nonsolvent. In this process, once the membrane is sufficiently dried and phase inverted, the structure is placed in a glycerine tank to aid in membrane preservation.

EXAMPLES AND COMPARATIVE

Example 1
Tandem Offset Gravure/Slot Die Coating—Reverse Osmosis

A number of membranes were separately formed on polysulfone ultrafiltration substrates as manufactured by Koch Membrane Systems of Wilmington, Mass. (KMS), which have an average pore size of 0.01 microns. In each instance, the substrate was first offset gravure coated with a 2% by weight aqueous solution of metaphenylenediamine (MPD) having 0.15% by weight of sodium dodecyl sulfate as a surfactant. The subsequent solvent layer was applied in a wet-on-wet fashion using a slot die in tandem to the offset gravure. The solvent layer comprised a solution of 1% by weight of trimesyol chloride (TMC) in a hexane, VM&P Naphtha HC co-solvent composition. The concentration, or dry coverage, of both the MPD and the TMC were varied by use of a high precision cavity pump. The web speeds employed varied between 65 and 200 ft/min (20 and 60 meters/min). The dry bulb temperature varied between 50° C. and 80° C.

The results of tests to determine the effects of the different coating parameters on the ultimate performance of a reverse osmosis membrane produced in accordance with the present invention process are shown in Table 1. Flux and rejection characteristics were generated under 220 psi using a 0.2% sodium chloride solution.

TABLE 1

Effect of Coating Parameters on Tandem Offset Gravure/Slot Die Coated Reverse Osmosis Membrane

| Dry Coverages mg/ft$^2$ (mg/meter$^2$) | | Dry Bulb | Web Speed fpm | Flux gfd | % Rejection |
|---|---|---|---|---|---|
| MPD | TMC | ° C. | (meters/min) | (lmh) | NaCl |
| 13 (140) | 13 (140) | 50 | 65 (20) | 26 (45.8) | 99.3 |
| 13 (140) | 13 (140) | 50 | 100 (30) | 28 (47.6) | 99.4 |
| 13 (140) | 13 (140) | 50 | 200 (60) | 28 (47.6) | 99.2 |
| 13 (140) | 13 (140) | 80 | 100 (30) | 18 (30.6) | 99.1 |
| 13 (140) | 26 (280) | 50 | 65 (20) | 10 (17) | 99.3 |
| 13 (140) | 13 (140) | 50 | 65 (20) | 26 (45.8) | 99.3 |
| 13 (140) | 2 (22) | 50 | 65 (20) | 57 (95.8) | 62.0 |
| 26 (280) | 26 (280) | 50 | 65 (20) | 14 (23.8) | 99.3 |
| 6 (65) | 13 (140) | 50 | 65 (20) | 65 (108.3) | 56.3 |

It is noted that relatively high levels or low levels of TMC cause a corresponding degradation in flux or rejection, respectively. In the case of relatively high dry coverages of TMC, the membranes behave hydrophobically, having low fluxes and superior rejections. For the compositions containing relatively low dry coverage of TMC, poor membrane formation was exhibited by low rejections and high fluxes. Similarly, relatively high dry coverage of MPD resulted in a decrease in flux, while maintaining NaCl rejection. Conversely, low dry coverage of MPD resulted in high fluxes and low NaCl rejection.

As can be seen by reference to Table 1 above, at high web speeds of 200 ft/min (60 meters/min), and at otherwise optimum dry coverages of the reactive species (13 mg/ft$^2$) and dry bulb conditions (50° C.), the resultant reverse osmosis membrane properties show NaCl rejections falling off 65% or low fluxing membranes. These results indicate that there are several critical parameters in the present tandem offset gravure/slot die coating process for reverse osmosis membrane formation, including drying conditions, web speed, and dry coverages of reactants.

Example 2
Tandem Slot Die Coating—Reverse Osmosis

This example illustrates the effect that small variations from an equimolar or stoichiometric ratio between MPD and TMC functional groups have on the resultant properties of a reverse osmosis membrane using a tandem slot die coating arrangement. Optimized stoichiometries with respect to MPD and TMC are presented in Table 2.

As in Example 1, the membrane was formed on a KMS polysulfone ultrafiltration substrate with a 0.1 micron average pore size. The substrate was first slot coated with a 3% by weight aqueous solution of MPD having a 0.15% by weight sodium dodecyl sulfate surfactant. As in Example 1, the subsequent solvent layer was applied in a wet-on-wet fashion using a second slot die in tandem to the first slot die. This solvent layer comprised a 1% solution of TMC in a hexane and VM&P Naphtha HC co-solvent composition. The dry coating rates were achieved through the use of a high precision cavity pump. As can be seen from Table 2 below, the web speeds were varied from 65 to 200 fpm without effecting the fimctional performance of the reverse osmosis membrane.

TABLE 2

Effect of Coating Parameters on Tandem Slot Die Coated Reverse Osmosis Membrane Formation Chemistry

| Dry Coverages mg/ft$^2$ (mg/meter$^2$) | | Dry Bulb | Web Speed fpm | Flux gfd | % Rejection |
|---|---|---|---|---|---|
| MPD | TMC | ° C. | (meters/min) | (lmh) | NaCl |
| Dow Filmtec, Inc.: FT-30 (Comparative Dip Coated Method) | | Approx. 10 | | 28 (47.6) | 99.1 |
| 12 | 8 | 50 | 65 | 46 (78.2) | 99.6 |
| 12 | 8 | 65 | 100 | 48 (81.6) | 99.5 |
| 12 | 8 | 80 | 200 | 45 (76.5) | 99.5 |
| 12 | 3 | 50 | 65 | 80 (136) | 51.2 |
| 6 | 8 | 50 | 65 | 67 (113.9) | 48.9 |
| 12 | 10 | 50 | 65 | 50 (85) | 99.7 |
| 12 | 20 | 50 | 65 | 18 (30.6) | 99.3 |
| 15 | 8 | 50 | 65 | 41 (69.7) | 99.5 |
| 20 | 8 | 50 | 65 | 11 (18.7) | 99.3 |

The first entry shown in Table 2 is a comparative representation of a commercially available reverse osmosis membrane from Dow Filmtec, Inc. of Minneapolis, Minn., which has been manufactured in accordance with conventional dip coating technology. Typical web speed for the production of such a membrane is 10 ft/min (3 meters/min). Coverages of MPD and TMC or similar components on dip coated membranes is generally not precisely known or controlled.

All other test results in Table 2 are for reverse osmosis membranes formed using the present invention processes.

The next three entries show concentrations of 12 mg/ft$^2$ and 8 mg/ft$^2$, respectively, of MPD and TMC, wherein the concentrations are achieved by precise metering of stoichiometric quantities of those constituents, with 3 units of MPD mixing stoichiometrically with 2 units of TMC. As can readily be seen, precise application of stoichiometric amounts of MPD and TMC using the process of the present invention results in flux characteristics which are 70% improved over flux available from prior art membranes. The next six data entries show testing results of membranes formed in accordance with the present invention, wherein the stoichiometric mix of MPD and TMC is varied. It can readily be seen that a variation of about 25% of either MPD or TMC from the optimum 3:2 stoichiometric value produces membranes with high flux and rejection characteristics. The best results have been obtained with about 28% excess TMC (12 mg/ft$^2$ MPD and 10 mg/ft$^2$ TMC), at which point a flux of almost twice the flux value of the prior art membrane is shown, with a surprisingly significant improvement in rejection characteristics. As discussed above with respect to Example 1, the data of Example 2 demonstrates that utilizing excess amounts of either MPD or TMC results in corresponding undesirable membrane flux and rejection chacteristics. For example, at 60% excess MPD with respect to the optimum 3:2 ratio (20 mg/ft$^2$ MPD and 8 mg/ft$^2$ TMC), only 22% of the flux capacity was achieved, with a moderately reduced rejection characteristic. Similarly, at 50% decrease MPD with respect to the optimum 3:2 ratio (6 mg/ft$^2$ MPD and 8 mg/ft$^2$ TMC), rejection capacity was measured to be only 48.9%.

Thus, although the prior art teaches that the concentrations of the two constituents are not important relative to interfacial polymerization, it has surprisingly been found that the relative concentrations of the primary components of the two layers, along with other factors, is critical of the process of the present invention.

Example 3
Tandem Slot Die Coating—Reverse Osmosis

Table 3 provides additional testing at the testing conditions noted in Example 2 regarding the effect of the dry coverage of the constituents on the flux and rejection characteristics of an interfacially polymerized reverse osmosis membrane.

TABLE 3

Effect of Reagent Dry Coverage on Flux and Rejection
of a Interfacially Polymerized Reverse Osmosis Membrane

| Dry Coverage MPD mg/ft$^2$ | Dry Coverage TMC mg/ft$^2$ | Flux gfd | % Rejection NaCl |
|---|---|---|---|
| 5 | 5 | 73 | 51.5 |
| 5 | 15 | 69 | 49.1 |
| 5 | 25 | 63 | 55.9 |
| 15 | 5 | 18 | 51.3 |
| 15 | 15 | 21 | 99.3 |
| 15 | 25 | 9 | 99.5 |
| 25 | 5 | 24 | 53.7 |
| 25 | 15 | 14 | 99.4 |
| 25 | 25 | 8 | 99.3 |

Example 4
Tandem Slot Die Coating—Reverse Osmosis

Table 4 below demonstrates the effect of solvent wet load and reagent dry coverage on the flux and rejection characteristics of an interfacially polymerized reverse osmosis membrane. The solvent system used in the organic layer was hexane and naphtha. The testing conditions were the same as those set forth in Example 2.

TABLE 4

Effect of Solvent Wet Load and Reagent Dry Coverage on Flux and
Rejection of a Interfacially Polymerized Reverse Osmosis Membrane

| Coverages mg/ft$^2$ | | Flux | % Rejection |
|---|---|---|---|
| MPD/Water | TMC/Solvent | gfd | NaCl |
| 5/300 | 5/300 | 73 | 51.5 |
| 5/150 | 5/1250 | 69 | 49.1 |
| 5/75 | 15/1250 | 77 | 35.1 |
| 25/1000 | 2/350 | 35 | 46.5 |
| 12/100 | 10/1000 | 47 | 99.7 |
| 12/500 | 10/1000 | 50 | 99.3 |
| 12/1000 | 10/2000 | 49 | 99.5 |
| 25/357 | 15/1000 | 6 | 99.1 |
| 25/357 | 15/1250 | 14 | 98.5 |
| 25/357 | 15/5000 | 8 | 99.2 |

Example 5
Tandem Offset Gravure/Slot Die Coating—Nanofiltration

Table 5 shows the effect of coating parameters on the performance of nanofiltration membranes produced using the tandem offset gravure/slot die coating process of the present invention. The membranes were formed in accordance with the chemistries outlined in U.S. Pat. No. 4,690,766 to Linder et al., which is hereby incorporated herein by reference. Specifically, the membranes shown in Table 5 were formed by first utilizing offset gravure coating to form layer of a 2% by weight solution of PEI having about 0.08% by weight Triton X-100™ made by Aldrich Chemical Company, Milwaukee, Wis., as a surfactant, and utilizing a 20 ft/min (6 meters/min) web speed with relatively low air velocities of 7,000 ft/min (2,000 meters/min). The dry coverage of the PEI ranged from 10 mg/ft$^2$ to 200 mg/ft$^2$. Upon the wet layer of the PEI surfactant mixture was placed via a slot die applicator an organic solution comprising cyanuric chloride in a hexane solvent. The dry coverage of the cyanuric chloride was varied from 1 mg/ft$^2$ to 20 mg/ft$^2$. Table 5 shows various dry bulb temperatures utilized to form the membrane in the ovens, as well as the various dry coverages of cyanuric chloride and PEI used with the corresponding rejection and flux results from the membranes formed in the present invention process. It can be seen that the nanofiltration performance of a tandem offset gravure/slot die coating membrane to reject sucrose and/or glucose is directly proportional to the dry bulb temperature of the ovens in this slot coating process.

TABLE 5

Effect of Coating Parameters on the
Performance of a Nanofiltration Membrane

| Dry Bulb (° C.) | Dry Coverage mg/ft$^2$ (mg/meter$^2$) | | Flux gfd (lmh) | % Rejection Sucrose | % Rejection Glucose |
|---|---|---|---|---|---|
| | PEI | CyCl$_3$ | | | |
| 50 | 10 (100) | 10 (100) | 72 (122) | 20 | — |
| 50 | 20 (200) | 10 (100) | 65 (110.5) | 33 | — |
| 50 | 20 (200) | 10 (100) | 59 (100) | 41 | — |

TABLE 5-continued

Effect of Coating Parameters on the
Performance of a Nanofiltration Membrane

| Dry Bulb (° C.) | Dry Coverage mg/ft$^2$ (mg/meter$^2$) | | Flux gfd (lmh) | % Rejection Sucrose | % Rejection Glucose |
|---|---|---|---|---|---|
| | PEI | CyCl$_3$ | | | |
| 70 | 20 (200) | 10 (100) | 55 (94) | 88 | 47 |
| 80 | 20 (200) | 10 (100) | 41 (70) | 99 | 99 |
| 80 | 20 (200) | 10 (100) | 16 (27) | 99 | 99 |

Example 6
Slot Die Coating—Ultrafiltration

Table 6 shows the effects of different coating parameters on the performance of an ultrafiltration membrane utilizing the present invention process. The membranes were formed using commercially available polysulfone, namely Udel® P-1835 available from Amoco of Alpharetta, Ga., and polyethersulfone, namely Ultrason® E6020Q691 Resin P available from BASF of Rensselaer, N.Y. The solutions were slot die coated as in the above examples at 20 ft/min through a single slot coater using an oven dry bulb temperature of 50° C. with a total solids of 20%.

TABLE 6

Effect of Solvent, Non-solvent Composition on
Slot Die Coated Ultrafiltration Membrane Performance

| Polymer | % CH$_2$CL$_2$/IPOH | Flux gfd (lmh) | % Rejection 17 k Dextran |
|---|---|---|---|
| Polysulfone | 100/0 | 0 (0) | — |
| Polysulfone | 80/20 | 60 (100) | 40 |
| Polysulfone | 75/25 | 79 (133.3) | 56 |
| Polyethersulfone | 80/20 | 30 (50) | 71 |
| Polyethersulfone | 75/25 | 25 (41.7) | 67 |

The application of slot die coating to the manufacturing of reverse osmosis membranes by using this two-step tandem application to form cross-linked interfacially polymerized reverse osmosis membrane is a substantial advancement in the technology of manufacturing such membranes. As noted herein, the prior art process of dip coating is difficult to control and produces a large amount of scrap material. Because of the difficulty in controlling thickness of the applied coating, the coating in a dip process is applied in a relatively thick layer on the substrate (about 1.0 micron or higher), thus limiting throughput of the processed solution and reducing the overall functional usefulness of the membrane thus produced. Moreover, the dip coating technology has roughly a ten percent degree of accuracy associated with it. In comparison, tandem slot die coating or offset gravure/slot die coating of the present invention is a highly controllable process allowing precise quantitative application of a very thin layer of material to the substrate as it is moved through the manufacturing process, on the order of 25 Å to 1.0 micron with web speeds ranging from about 20 to 200 linear feet/min. The application of controllably thin layers without holes or voids produces a membrane which has an overall higher efficiency than membranes manufactured with prior art manufacturing processes. Such efficiency is exhibited by high filtrate rejection characteristics coupled with a high permeate throughput. Indeed, test results indicate a throughput enhancement on the order of 100% with substantial enhancement in rejection characteristics. Thus, the present invention slot coating process for manufacturing filtration membranes is a substantial advancement over the prior art processes. Further, the slot coating process of the present invention can provide a coating accuracy of ±1% of the targeted coverage.

From the foregoing, it will be seen that this invention is one well adapted to attain all the ends and objects set forth, along with other advantages which are obvious or are inherent to the invention.

It is contemplated by and within the scope of the claims that certain features and sub-combinations are of utility and may be employed without reference to other features and sub-combinations.

Since many possible embodiments may be made of the invention without departing from its scope, the matters set forth in this application are to be interpreted as illustrative and not in a limiting sense.

We claim:

1. A process for continuously coating a continuous porous substrate to prepare a composite filtration membrane comprising:

providing a first liquid component;

providing a first applicator means for applying the first liquid component onto the substrate, wherein said first applicator means comprises a slot die head or a direct gravure applicator;

applying a quantitative amount of the first component onto the substrate to coat the substrate and form a liquid layer by relatively moving the substrate and the first applicator with respect to each other at a speed of between 20 and 200 feet per minute;

providing a second liquid component;

providing a second applicator means in tandem with the first applicator means for applying the second liquid component, wherein said second applicator means comprises a slot die head;

applying a quantitative amount of the second liquid component onto the liquid layer to contact the second liquid component with the liquid layer by relatively moving the substrate coated with the liquid layer and the second applicator with respect to each other;

allowing the first and second liquid component to interfacially polymerize to form a composite layer of a thickness of between about 25 Å and 1 micron; and drying the composite layer to form a composite membrane.

2. The process as set forth in claim 1, wherein the relative movement of the substrate and the applicators comprises moving the substrate under the first applicator and the second applicator.

3. The process as set forth in claim 1, wherein the substrate comprises an asymmetrical microporous polymer supported by a carrier web.

4. The process as set forth in claim 1, wherein the composite membrane comprises a reverse osmosis membrane.

5. The process as set forth in claim 4, wherein the first liquid component comprises an aqueous solution of a first reactant in water.

6. The process as set forth in claim 5, wherein the first reactant comprises metaphenylenediamine.

7. The process as set forth in claim 5, wherein the aqueous solution further comprises a surfactant.

8. The process as set forth in claim 4, wherein the second liquid component comprises an organic solution.

9. The process as set forth in claim 8, wherein the organic solution comprises a second reactant and a co-solvent.

10. The process as set forth in claim 9, wherein the second reactant is selected from the group comprising trimesyol chloride, cyanuric chloride, bischloromethylpyridine, and modified trianzyl moieties.

11. The process as set forth in claim 9, wherein the co-solvent comprises a hydrocarbon solvent and a high boiling point solvent.

12. The process as set forth in claim 4, wherein the first liquid component comprises an aqueous solution of a first reactant in water, and the second liquid component comprises an organic solution of a second reactant and a co-solvent.

13. The process as set forth in claim 12, wherein the molar ratio of the first reactant to the second reactant is stoichiometric.

14. The process as set forth in claim 12, wherein the first reactant comprises metaphenylenediamine, and the second reactant comprises trimesyol chloride.

15. The process as set forth in claim 14, wherein the molar ratio of the first reactant to the second reactant is about 3 to 2.

16. The process as set forth in claim 1, wherein the composite membrane comprises a nanofiltration membrane.

17. The process as set forth in claim 16, wherein the first liquid component comprises an aqueous solution of a first reactant in water.

18. The process as set forth in claim 17, wherein the first reactant comprises poly(ethyleneimine) with a weight average molecular weight of about 60,000.

19. The process as set forth in claim 17, wherein the aqueous solution further comprises a surfactant.

20. The process as set forth in claim 16, wherein the second liquid component comprises an organic solution.

21. The process as set forth in claim 20, wherein the organic solution comprises a second reactant and a co-solvent.

22. The process as set forth in claim 21, wherein the second reactant possesses a nucleophilic site or sites capable of reacting to molecules, the second reactant selected from the group comprising cyanuric chloride, chlorinated pyridine, chlorinated pyrimidines, and modified trianzyl moieties.

23. The process as set forth in claim 16, wherein the first liquid component comprises an aqueous solution of a first reactant in water, and the second liquid component comprises an organic solution of a second reactant and a solvent.

24. The process as set forth in claim 23, wherein the molar ratio of the first reactant to the second reactant is stoichiometric.

25. The process as set forth in claim 23, wherein the first reactant comprises poly(ethyleneimine) and the second reactant comprises cyanuric chloride.

* * * * *